United States Patent Office 3,420,643
Patented Jan. 7, 1969

3,420,643
METHOD FOR REFORMING LIGHT PETROL FRACTIONS UNDER PRESSURE
Jean Housset, Saint-Nazaire, Jacques Quibel, Paris, Pierre Lhonore, Douai, and Robert Pidoux, Saint-Nazaire, France, assignors to La Societe Chimique de la Grande Paroisse, Azote et Produits Chimiques
No Drawing. Filed Aug. 24, 1965, Ser. No. 482,235
U.S. Cl. 48—214                           5 Claims
Int. Cl. C01b 2/14

ABSTRACT OF THE DISCLOSURE

A process for the catalytic reforming with water vapor of hydrocarbons heavier than methane, which comprises passing the reforming mixture under an effective pressure in the range of from 0 to 80 bars through a reforming zone containing a catalyst, wherein the reforming mixture is contacted with the catalyst at an initial temperature in the range of from 430 to 600° C. and (1) the quantity of catalyst, per metre of the reforming zone, (2) the quantity of reforming mixture entering the reforming zone and (3) the heating rate are selected so that the average rise is the temperature of the catalyst in the first metre of the reforming zone is in the range of from 80 to 120° C. and the average temperature rise of the catalyst in the second metre of the reforming zone is in the range of from 75 to 100° C.

---

This invention relates to the production of gas for the synthesis of ammonia or methanol or of town's gas and more particularly to the reforming, by means of water vapor catalyst, of hydrocarbons heavier than methane and especially of light fractions of petrol with a final boiling point generally between 100 and 250° C. The products to be treated are mainly formed of paraffin hydrocarbons but they may contain unsaturated hydrocarbons up to a molar proportion of about 40%.

In the vapor reforming of light petrol fractions, it is, for example, possible to vaporize and superheat the hydrocarbon to 300 to 400° C., then to add the water vapor and to superheat the mixture. The mixture is then treated with catalysts adapted to initiate the reaction leading to the formation of hydrogen and carbonoxide.

According to the known reforming method under pressure, with catalysts used in these processes and containing generally nickel, the hydrocarbon-water vapor mixture is introduced at a higher temperature requiring preheating of the order of 550 to 650° C. into a high capacity exchanger, in which the stay time of the gaseous mixture must be short to avoid free carbon deposits.

There has been discovered according to the invention, in order to reform hydrocarbons with steam, and especially hydrocarbons heavier than methane and possibly unsaturated, under an effective pressure comprised preferably between 0 and 80 bars, a new method wherein the temperature regime in the reforming zone, and the dimensioning of this zone as a function of the yields and the pressure, make possible the introduction of the hydrocarbon-water vapor mixture at comparatively lower temperatures than those usually used without incurring deposits of carbon black on the catalysts, and the production of a maximum efficiency of the installation.

The method is characterized in that the reforming mixture is introduced to the catalyst at an input temperature between 430 and 600° C. and preferably between 480 and 550° C., and in that the catalyst charge, the mass delivery entering the reforming zone, and the heating rate are so selected that the average speed of the temperature rise in this zone in the first metre of catalyst is greater than the average speed of the temperature rise in the second metre, this temperature progression in the first metre being between 80 and 120° C. and in the second metre between 75 and 100° C.

This new method has the advantage of permitting a lower preheating of the hydrocarbons at a temperature of not more than 200 to 300° C., prior to its mixing with the superheated steam.

It has been discovered that the speed of the temperature rise in the first metres of catalyst is of importance for the formation of carbon black. An excessively quick temperature rise causes the decomposition of the hydrocarbons which form carbon and/or carbonaceous substances. In order to avoid any risk of carbon forming on the catalyst, it has been found that, for a fraction with the formula $C_6H_{14}$, for an input temperature of 490° C. to the catalyst, at the end of one metre the temperature must be between 570 and 610° C. and at the end the second metre between 645 and 710° C. This law of the temperature progression in the input reforming zone, wherein the average speed of the temperature rise in this zone in the first metre of catalyst is greater than the average speed of the temperature rise in the second metre, applies to light petrol fractions used in steam reformation.

In order to apply the invention advantageously with a vapor rate—the relation between the number of water molecules and carbon atoms differing very little from the theoretical minimum rate—the dimensioning of the tube, the charge of the catalyst, and the reforming mixture entering the tube must be such that the heat exchange between the skin of the tube, the catalyst and the gaseous mixture have optimum values with a gradient between the hottest and the coldest point in a section of the tube adapted to the operating pressure and the hydrocarbon used, and that the contact time in the temperature zones at between 500 and 600° C. is neither too long nor too short.

The Table A, below, brings, according to the invention, the rules for varying the diameter of a reforming tube for treating a light petrol fraction with a yield between 35 and 50 kg./h. with a vapor rate varying from 2 to 5 and under an operating pressure between 10 and 40 bars effective valve.

The variations in the dimensions of the reforming tube indicated above for a given hydrocarbon and a constant steam rate as a function of the yield and the operating pressure make it possible to obtain an optimum output with the new method.

Generally, the catalysts conventionally used for reforming are suitable according to the invention, in particular, catalysts containing nickel on refractory oxide

TABLE A

| H₂O/C Molar ratio | Effective pressure in bars | Minimum inner dia. of tube in mm. | Maximum inner dia. of tube in mm. |
|---|---|---|---|
| 2 | 10 | 85 | 95 |
| 2 | 20 | 80 | 90 |
| 2 | 30 | 75 | 85 |
| 2 | 40 | 70 | 80 |
| 2.5 | 10 | 88 | 98 |
| 2.5 | 20 | 83 | 93 |
| 2.5 | 30 | 78 | 88 |
| 2.5 | 40 | 73 | 83 |
| 3 | 10 | 90 | 100 |
| 3 | 20 | 85 | 95 |
| 3 | 30 | 80 | 90 |
| 3 | 40 | 75 | 85 |
| 4 | 10 | 95 | 105 |
| 4 | 20 | 90 | 100 |
| 4 | 30 | 85 | 95 |
| 4 | 40 | 80 | 90 |
| 5 | 10 | 100 | 110 |
| 5 | 20 | 95 | 105 |
| 5 | 30 | 90 | 100 |
| 5 | 40 | 85 | 95 | bases. According to one embodiment it is possible to use to advantage magnesium, zirconium or silicon catalysts which form the object of a French patent application No. 989,346 filed by the applicants on Sept. 25, 1964 under the title "Catalyst Compositions for Steam Reforming" which corresponds to the U.S. patent application Ser. No. 485,366, filed Sept. 7, 1965.

In the following, there is given an example illustrating the invention in a non-limitative manner.

EXAMPLE

Through a reaction tube of 90 mm. diameter under an effective pressure of 20 bars were passed 35 kg. per hour of the light petrol fraction with the crude formula $C_{6.17}H_{14.20}$. The tube is filled to one half with a catalyst containing 8 percent nickel oxide, then for the other half with a catalyst containing 32 percent nickel oxide. The catalysts are of the magnesium, zirconium, silicon-type as defined above.

A series of tests is carried out in a pilot plant. The values relating to the vapor rate, the inlet and outlet temperatures of the hydrocarbon-water vapor mixture, and the composition of the outgoing gas are summarized in the following Table B:

TABLE B

| Steam/Carbon ratio in moles | Inlet temp. of mixture, °C. | Outlet temp. of mixture, °C. | Composition of the outgoing gas (calculated on a dry gas basis) | | | | | |
|---|---|---|---|---|---|---|---|---|
| | | | CO₂ | CO | CH₄ | C₂H₆ | H₂ | N₂ |
| 3.3 | 490 | 775 | 14.7 | 10.1 | 4.5 | 0.1 | 69.1 | 1.5 |
| 4.95 | 490 | 775 | 12.8 | 10.5 | 5.4 | 0.2 | 69.5 | 1.6 |
| 3.6 | 490 | 775 | 14.2 | 11.2 | 6.1 | 0.1 | 66.7 | 1.7 |
| 3.0 | 490 | 770 | 11.5 | 11.5 | 6.8 | 0.2 | 68.5 | 1.5 |
| 2.8 | 490 | 775 | 12.2 | 12.8 | 7.3 | 0.3 | 65.8 | 1.6 |
| 2.6 | 500 | 790 | 11.2 | 14.4 | 6.4 | 0.1 | 66.3 | 1.6 |

What is claimed is:

1. A method for the continuous catalytic reforming with water vapor of hydrocarbons heavier than methane comprising
    continuously passing the reforming mixture of hydrocarbon and water vapor under an effective pressure in the range of from 0 to 80 bars through a reforming zone having a length of at least two meters and containing a catalyst, said reforming mixture contacting said catalyst at an initial temperature in the range of from 430 to 600° C., wherein said catalyst is heated and the temperature of the reforming mixture arises during its passage through said reforming zone;
    wherein (1) the charge of catalyst, (2) said reforming mixture entering said reforming zone, (3) and the rate of said heating are so selected that the average speed of said temperature rise in said zone in the first of said two meters of catalyst length is greater than the average speed of the temperature rise in the second meter of said catalyst length, said temperature progression in said first meter being between 80 and 120° C., and in said second meter being between 75 and 100° C.

2. A reforming method according to claim 1, wherein the reforming mixture is introduced to the catalyst at an inlet temperature between 480 and 550° C.

3. A reforming method according to claim 1, wherein the inlet temperature to the catalyst is obtained by mixing the hydrocarbon with superheated water vapor, said hydrocarbon having been previously vaporized by preheating at 200—300° C.

4. A reforming method according to claim 1 wherein the diameter of the reforming zone is selected for a given hydrocarbon as a function of the molar ratio of steam to carbon and the operating pressure according to the table:

| H₂O/C Molar ratio | Effective pressure in bars | Minimum inner inner dia. of tube in mm. | Maximum inner dia. of tube in mm. |
|---|---|---|---|
| 2 | 10 | 85 | 95 |
| 2 | 20 | 80 | 90 |
| 2 | 30 | 75 | 85 |
| 2 | 40 | 70 | 80 |
| 2.5 | 10 | 88 | 98 |
| 2.5 | 20 | 83 | 93 |
| 2.5 | 30 | 78 | 88 |
| 2.5 | 40 | 73 | 83 |
| 3 | 10 | 90 | 100 |
| 3 | 20 | 85 | 95 |
| 3 | 30 | 80 | 90 |
| 3 | 40 | 75 | 85 |
| 4 | 10 | 95 | 105 |
| 4 | 20 | 90 | 100 |
| 4 | 30 | 85 | 95 |
| 4 | 40 | 80 | 90 |
| 5 | 10 | 100 | 110 |
| 5 | 20 | 95 | 105 |
| 5 | 30 | 90 | 100 |
| 5 | 40 | 85 | 95 |

5. A method in accordance with claim 1 wherein said hydrocarbons heavier than methane consist of paraffins with up to 40 mol percent unsaturated hydrocarbons.

References Cited

FOREIGN PATENTS 772,787  4/1957  Great Britain.
999,103  7/1965  Great Britain.

MORRIS O. WOLK, *Primary Examiner.*

R. E. SERWIN, *Assistant Examiner.*

UNITED STATES PATENT OFFICE
CERTIFICATE OF CORRECTION

Patent No. 3,420,643 January 7, 1969

Jean Housset et al.

It is certified that error appears in the above identified patent and that said Letters Patent are hereby corrected as shown below:

Column 1, line 24, "is" should read -- in --. Column 3, TABLE B, first column, line 1 thereof, "3.3" should read -- 4.3 --; same TABLE B, same first column, line 2 thereof, "4.95" should read -- 3.95 --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents